(12) United States Patent
Guan et al.

(10) Patent No.: US 11,653,597 B2
(45) Date of Patent: May 23, 2023

(54) **DEVICE AND METHOD FOR PICKING AND COLLECTING *BRASENIA SCHREBERI* BASED ON MACHINE VISION**

(71) Applicant: Jiangsu University, Jiangsu (CN)

(72) Inventors: Xianping Guan, Jiangsu (CN); Xiaokun Wu, Jiangsu (CN); Jin Zhuang, Jiangsu (CN); Xinhua Wei, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/770,052

(22) PCT Filed: Jul. 28, 2020

(86) PCT No.: PCT/CN2020/105130
§ 371 (c)(1),
(2) Date: Apr. 19, 2022

(87) PCT Pub. No.: WO2021/248654
PCT Pub. Date: Dec. 16, 2021

(65) Prior Publication Data
US 2022/0361406 A1   Nov. 17, 2022

(30) Foreign Application Priority Data

Jun. 10, 2020 (CN) .......................... 202010524197.4

(51) Int. Cl.
*A01D 44/00* (2006.01)
*A01D 46/30* (2006.01)
(Continued)

(52) U.S. Cl.
CPC ............. *A01D 44/00* (2013.01); *A01D 46/30* (2013.01); *B25J 9/104* (2013.01); *B25J 9/12* (2013.01);
(Continued)

(58) Field of Classification Search
CPC ......... A01D 44/00; A01D 44/02; A01D 46/30
See application file for complete search history.

(56) References Cited

FOREIGN PATENT DOCUMENTS

| CN | 106799735 | 6/2017 |
|---|---|---|
| CN | 108848889 | 11/2018 |

(Continued)

OTHER PUBLICATIONS

"International Search Report (Form PCT/ISA/210) of PCT/CN2020/105130," dated Mar. 8, 2021, with English translation thereof, pp. 1-5.

(Continued)

*Primary Examiner* — Adam J Behrens
*Assistant Examiner* — Madeline I Runco
(74) *Attorney, Agent, or Firm* — JCIP Global Inc.

(57) ABSTRACT

A device and a method for picking and collecting *Brasenia schreberi* based on a machine vision. The device includes a supporting mechanical arm, a collection device, two working mechanical arms, a picking manipulator, a grasping manipulator, a control box, and a visual system. The supporting mechanical arm is fixed on a front end of a boat; the two working mechanical arms are fixed on a front end of the supporting mechanical arm; the picking manipulator and the grasping manipulator are mounted on tail ends of the two working mechanical arms, respectively; and the collection device is fixed on the boat; the visual system determines a location of *Brasenia schreberi* and sends the location to the control box; the control box controls the two working mechanical arms, the grasping manipulator, and the picking manipulator to complete the grasping and picking of *Brasenia schreberi*; and the collection device collects *Brasenia schreberi*.

9 Claims, 8 Drawing Sheets

(51) Int. Cl.
  *B25J 9/10* (2006.01)
  *B25J 9/12* (2006.01)
  *B25J 9/16* (2006.01)
  *B25J 11/00* (2006.01)
  *B25J 15/08* (2006.01)
(52) U.S. Cl.
  CPC ............ *B25J 9/1697* (2013.01); *B25J 11/00* (2013.01); *B25J 15/08* (2013.01)

(56) References Cited

FOREIGN PATENT DOCUMENTS

| CN | 109397280 | 3/2019 |
| CN | 110637597 | 1/2020 |
| CN | 110637601 | 1/2020 |
| CN | 210589303 | 5/2020 |
| JP | H07214484 | 8/1995 |

OTHER PUBLICATIONS

"Written Opinion of the International Searching Authority (Form PCT/ISA/237) of PCT/CN2020/105130," dated Mar. 8, 2021, pp. 1-3.

DEVICE AND METHOD FOR PICKING AND COLLECTING *BRASENIA SCHREBERI* BASED ON MACHINE VISION

CROSS-REFERENCE TO RELATED APPLICATION

This application is a 371 of international application of PCT application serial no. PCT/CN2020/105130, filed on Jul. 28, 2020, which claims the priority benefit of China application no. 202010524197.4, filed on Jun. 10, 2020. The entirety of each of the above-mentioned patent applications is hereby incorporated by reference herein and made a part of this specification.

TECHNICAL FIELD

The present invention relates to the technical field of crop picking, and specifically, to a device and a method for picking and collecting *Brasenia schreberi* based on machine vision.

DESCRIPTION OF RELATED ART

*Brasenia schreberi* is a rare perennial aquatic plant in lakes and marshes belonging to Nymphaeaceae. Because of its growing environment, picking characteristics, and product quality requirements, the traditional hand-picking method is still used at present. Hand-picking of *Brasenia schreberi* is laborious and inefficient, causing edible *Brasenia schreberi* to grow too old to be eaten, and causing decline in economic yield per unit area of *Brasenia schreberi* and sharp reduction of the *Brasenia schreberi* planting area. Especially since the *Brasenia schreberi* picking period is long and is in summer and early autumn with high temperatures, pickers face a harsh picking environment. There is almost no research on picking equipment for *Brasenia schreberi* at present in our country.

SUMMARY

In view of the deficiencies in the prior art, the present invention provides a device and a method for picking and collecting *Brasenia schreberi* based on machine vision, thereby realizing mechanization of *Brasenia schreberi* picking and alleviating labor intensity of *Brasenia schreberi* pickers.

The present invention achieves the aforementioned technical objective by the following technical means.

A device for picking and collecting *Brasenia schreberi* based on a machine vision includes a supporting mechanical arm, a collection device, two working mechanical arms, a picking manipulator, a grasping manipulator, a control box, and a visual system, wherein the supporting mechanical arm is fixed on a front end of a boat; the two working mechanical arms are fixed on a front end of the supporting mechanical arm; the picking manipulator and the grasping manipulator are mounted on tail ends of a first working mechanical arm and a second working mechanical arm of the two working mechanical arms, respectively; and the collection device is fixed on the boat;

the supporting mechanical arm includes a supporting arm bottom plate, supporting arm side plates, a supporting arm rotary arm, a connecting plate, and a supporting arm supporting plate; the supporting arm bottom plate is fixed on the front end of the boat, the supporting arm side plates are respectively mounted on two sides of the supporting arm bottom plate, stepper motors are respectively mounted on the supporting arm side plates, and the stepper motors are connected to a first connecting shaft; a first end of the supporting arm rotary arm is fixed to the first connecting shaft, and a second end of the supporting arm rotary arm is connected to the connecting plate through a second connecting shaft to form a revolving pair; the connecting plate is fixed to the supporting arm supporting plate; the supporting arm supporting plate is fixed on a first end of a push rod, and a second end of the push rod is fixed on the boat;

the collection device includes a fixing frame, a third motor, a conveyor belt, a transmission mechanism, and a net bag; the fixing frame is mounted on the boat; the conveyor belt is fixed on the fixing frame through a conveyor belt rack; the third motor drives the conveyor belt to turn through the transmission mechanism; the net bag is mounted below the fixing frame;

the picking manipulator includes a first cylinder, a first connecting part, a plurality of supporting joints, and mechanical fingers; the first cylinder and the first connecting part are mounted on the tail end of the first working mechanical arm; the plurality of supporting joints are uniformly disposed; a first end of each of the plurality of supporting joints is fixedly connected to the first connecting part, and a second end of the each of the plurality of supporting joints is connected to a mechanical finger of the mechanical fingers through a first joint connecting rod and a second joint connecting rod; the first joint connecting rod and the second joint connecting rod are rotatably connected to the each of the plurality of supporting joints, and the first joint connecting rod and the second joint connecting rod are fixedly connected to the mechanical finger; the first cylinder is connected to a first transmission block; a first end of a first transmission connecting rod is connected to the first transmission block, and a second end of the first transmission connecting rod is connected to the first joint connecting rod;

the grasping manipulator includes a second cylinder, a second connecting part, and clamping arms; the second cylinder and the second connecting part are mounted on the tail end of the second working mechanical arm; each of the clamping arms is connected to the second connecting part to form a revolving pair; the second cylinder is fixedly connected to a second transmission block; two ends of a second transmission connecting rod are rotatably connected to the second transmission block and the each of the clamping arms, respectively; and the stepper motors, the push rod, the first cylinder, the second cylinder, the third motor, and the visual system are in a signal connection with the control box.

Each of the two working mechanical arms includes a bearing seat, a first motor, a reducer, a second motor, first main mechanical arms, a second main mechanical arm, and a steering engine seat; the bearing seat is fixedly connected to the supporting arm supporting plate, and the bearing seat is fixedly connected to the first motor; the first motor is connected to a working mechanical arm base, and the working mechanical arm base is fixedly connected to the reducer; an input end of the reducer is connected to the second motor, and an output shaft of the reducer is connected to the first main mechanical arms, the steering engine seat is fixedly connected to the second main mechanical arm, and a steering engine inside the steering engine seat is connected to the first main mechanical arms; and the first motor, the second motor, and the steering engine are in a signal connection with the control box.

Preferably, the bearing seat includes a bearing base, a bearing stand, a bearing, a bearing sleeve, a gasket, and a flange; the bearing base is connected to the supporting arm supporting plate, the bearing base is coaxially fixed to the bearing stand, the bearing is sleeved on the bearing stand, and the bearing is attached to the gasket; an output shaft of the first motor sequentially passes through the bearing base, the bearing stand, the bearing, and the gasket to be fixed to the flange; the bearing sleeve is sleeved on a periphery of the bearing; and the flange and the bearing sleeve are fixedly connected to the working mechanical arm base.

Preferably, a surface of each of the mechanical fingers is made of a rubber material and is provided with a texture, and the each of the mechanical fingers is provided with a curved groove in a middle.

Preferably, a sponge is fixed on a tail end of the each of the clamping arms.

Preferably, first stopper plates are fixed on two sides of the conveyor belt rack, and a second stopper plate is mounted on a tail end of the conveyor belt rack.

Preferably, the conveyor belt is provided with equally-spaced baffle plates, and the equally-spaced baffle plates are each provided with drainage holes.

Preferably, the visual system includes an overwater camera and an underwater camera; the overwater camera is located above the picking manipulator and the grasping manipulator; and the underwater camera is mounted on the supporting arm supporting plate and located between the two working mechanical arms.

A method for picking and collecting *Brasenia schreberi* based on a machine vision, wherein the control box adjusts an operating angle of the supporting arm supporting plate through the stepper motors and the push rod; the visual system determines a location of the *Brasenia schreberi* and sends the location to the control box; the control box controls the second working mechanical arm to drive the grasping manipulator to grip stems of the *Brasenia schreberi*; the control box controls the first working mechanical arm to drive the picking manipulator to pick the *Brasenia schreberi*; the control box controls the picking manipulator to rotate to a position above the conveyor belt; and the conveyor belt transports the *Brasenia schreberi* to the net bag to complete a picking process.

The beneficial effects of the present invention are the following.

(1) in the present invention, the second working mechanical arm cooperates with the grasping manipulator to complete *Brasenia schreberi* grasping; then, the first working mechanical arm cooperates with the picking manipulator to complete *Brasenia schreberi* picking; the supporting mechanical arm, the collection device, and the visual system are provided to realize mechanization of *Brasenia schreberi* picking, thereby greatly improving the working environment of manual picking of *Brasenia schreberi*;

(2) each of the working mechanical arms of the present invention includes the first motor, the working mechanical arm base, the reducer, the second motor, the first main mechanical arms, the second main mechanical arm, and the steering engine, wherein the output shaft of the first motor drives the working mechanical arm base to rotate, the second motor drives the reducer, the reducer drives the first main mechanical arms to rotate, and the output shaft of the steering engine drives the second main mechanical arm to rotate, so as to realize free movement of the working mechanical arms;

(3) the grasping manipulator of the present invention includes the second cylinder, the second connecting part, the second transmission block, the clamping arms, and the sponges, wherein the second cylinder drives the second transmission block to extend up and down; the second transmission connecting rod drives each of the clamping arms to close and open; the sponge is mounted on the tail end of each of the clamping arms to ensure that the grasping manipulator does not damage the stems of *Brasenia schreberi* during operation;

(4) the picking manipulator of the present invention includes the first cylinder, the first transmission block, the first transmission connecting rod, the first joint connecting rod, and the mechanical fingers, wherein the output shaft of the first cylinder drives the first transmission block to move up and down, which drives the first transmission connecting rods to move, and then drives the first joint connecting rods to rotate, so that the mechanical fingers open and close; the surface of each of the mechanical fingers is made of the rubber material and is provided with the texture, and each of the mechanical fingers has a curved groove structure in the middle, so that *Brasenia schreberi* can be desirably attached and wrapped with such design;

(5) the supporting mechanical arm of the present invention includes the supporting arm supporting plate, wherein the supporting arm supporting plate is connected to the connecting plate, the connecting plate forms a revolving pair with the second connecting shaft, the second connecting shaft passes through one end of the supporting arm rotary arm, the other end of the supporting arm rotary arm is fixed to the first connecting shaft, and the first connecting shaft is connected to output shafts of the stepper motors; the supporting arm supporting plate is fixed on one end of the push rod, and the other end of the push rod is fixed on the boat; the stepper motors drive the supporting arm rotary arm to rotate through the first connecting shaft; during extension, the push rod drives the supporting arm supporting plate to rotate in the vertical plane so as to drive the working mechanical arms to rotate;

(6) the collection device of the present invention includes the fixing frame, the third motor, the conveyor belt, the transmission mechanism, and the net bag, wherein the fixing frame is mounted on the boat, the conveyor belt is fixed on the fixing frame through the conveyor belt rack, the third motor drives the conveyor belt to rotate through the transmission mechanism, and the net bag is mounted below the fixing frame; the first stopper plates are fixed on two sides of the conveyor belt rack, and the second stopper plate is mounted on the tail end of the conveyor belt rack; the conveyor belt is provided with the equally-spaced baffle plates, and the equally-spaced baffle plates are each provided with drainage holes, so as to reduce falling of the collected *Brasenia schreberi*.

The reference signs in the figures are the following: 1—boat, 2—supporting mechanical arm, 3—collection device, 4—working mechanical arm, 5—picking manipulator, 6—grasping manipulator, 7—control box, 9—push rod, 21—supporting arm bottom plate, 22—supporting arm side plate, 23—stepper motor, 24—first connecting shaft, 25—supporting arm rotary arm, 26—second connecting shaft, 27—connecting plate, 28—supporting arm supporting plate, 29—bolt pair, 30—fixing frame, 31—third motor, 32—conveyor belt rack, 33—conveyor belt, 34—first stopper plate, 35—second stopper plate, 36—small belt pulley, 37—big belt pulley, 38—belt, 39—net bag, 40—steering engine seat, 41—first motor, 42—bearing seat, 43—working mechanical arm base, 44—working mechanical arm side plate, 45—second motor, 46—second motor base, 47—reducer, 48—first main mechanical arm, 49—second main mechanical arm, 421—bearing base, 422—bearing stand, 423—bearing, 424—gasket, 425—flange, 426—bearing sleeve, 471—lower shell, 472—upper shell, 473—worm, 474—worm gear, 475—lower end cap, 476—worm gear output shaft, 51—first cylinder, 52—first connecting part, 53—supporting joint, 54—first joint connecting rod, 55—second joint connecting rod, 56—mechanical finger, 57—first transmission connecting rod, 58—first transmission block, 61—second cylinder, 62—second connecting part, 63—clamping arm, 64—second transmission connecting rod, 65—second transmission block, 66—sponge, 82—underwater camera, 83—overwater camera, 84—boom.

DESCRIPTION OF THE EMBODIMENTS

The present invention is further illustrated below with reference to the accompanying drawings and specific embodiments, but the protection scope of the present invention is not limited thereto.

Figure 1:
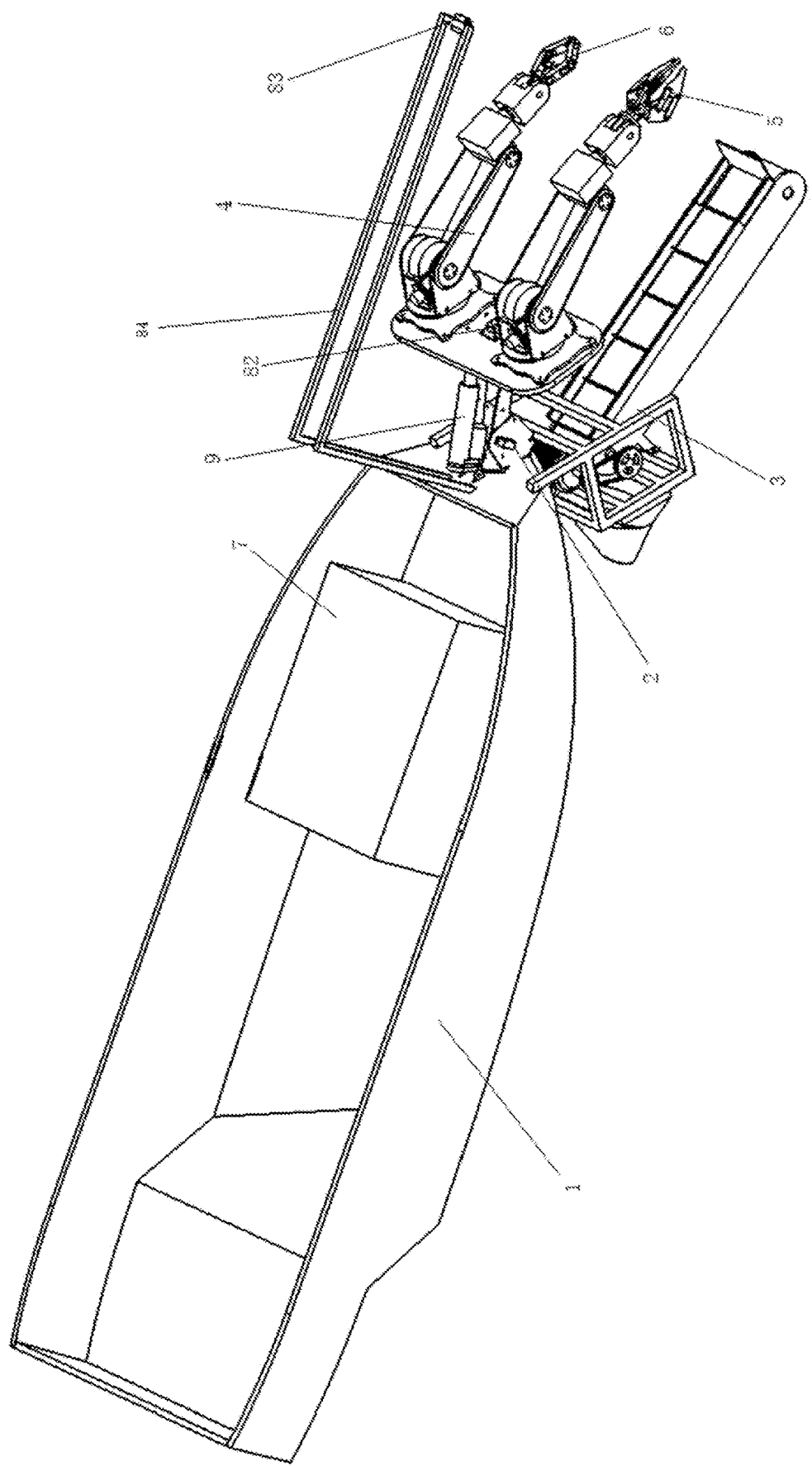
FIG. 1 is a schematic structural view of a device for picking and collecting *Brasenia schreberi* based on machine vision in the present invention.

As shown in FIG. 1, a device for picking and collecting *Brasenia schreberi* based on machine vision includes a supporting mechanical arm 2, working mechanical arms 4 for cooperation with manipulators, a collection device 3 for collecting *Brasenia schreberi*, a picking manipulator 5, a grasping manipulator 6, a push rod 9, a control box 7, and a visual system.

Figure 2:
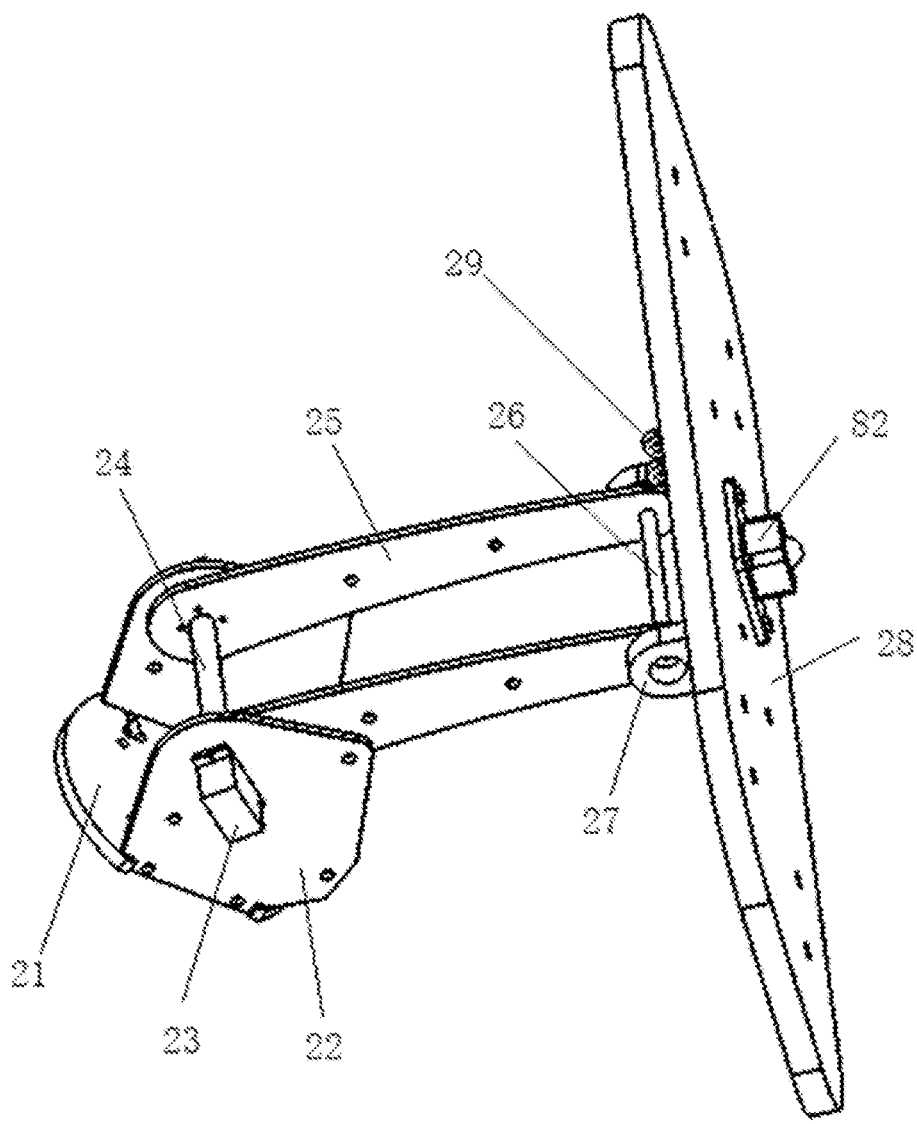
FIG. 2 is a schematic structural view of a supporting mechanical arm in the present invention.

As shown in FIG. 2, the supporting mechanical arm 2 consists of a supporting arm bottom plate 21, supporting arm side plates 22, a supporting arm rotary arm 25, a first connecting shaft 24, a second connecting shaft 26, stepper motors 23, a connecting plate 27, and a supporting arm supporting plate 28. The supporting arm bottom plate 21 is fixedly connected on a front end of a boat 1 by means of bolts. The supporting arm side plates 22 are respectively mounted on two sides of the supporting arm bottom plate 21. The two stepper motors 23 are mounted on the supporting arm side plates 22 respectively. Output shafts of the two stepper motors 23 are connected to the first connecting shaft 24. The first connecting shaft 24 passes through one end of the supporting arm rotary arm 25 and is fixed by means of a pin. The second connecting shaft 26 passes through the other end of the supporting arm rotary arm 25. The second connecting shaft 26 is connected to the connecting plate 27 to form a revolving pair. The connecting plate 27 is fixedly connected to the supporting arm supporting plate 28. One end of the push rod 9 is hingedly connected to the boat 1, and the other end of the push rod 9 is fixed with bolts through a bolt pair 29 (located on the supporting arm supporting plate 28) above the second connecting shaft 26. The two stepper motors 23 drive the supporting arm rotary arm 25 to rotate through the first connecting shaft 24. During extension, the push rod 9 drives the supporting arm supporting plate 28 to rotate in a vertical plane.

Figure 3:
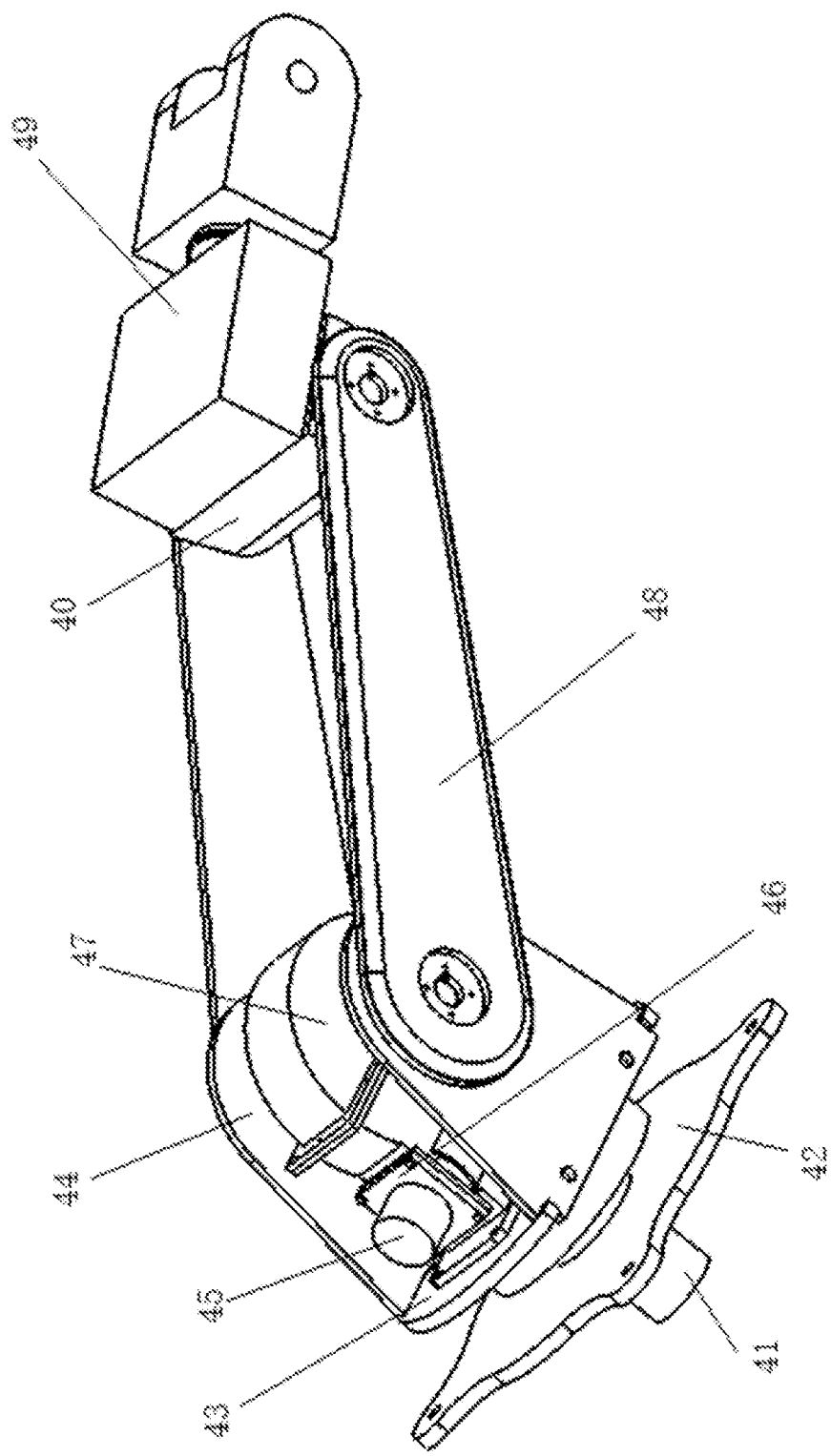
FIG. 3 is a schematic structural view of a working mechanical arm in the present invention.

The two working mechanical arms 4 are symmetrically fixed on the supporting arm supporting plate 28. As shown in FIG. 3, the working mechanical arm 4 includes a bearing seat 42, a first motor 41, a working mechanical arm base 43, mechanical arm side plates 44, a reducer 47, a second motor 45, a second motor base 46, first main mechanical arms 48, a second main mechanical arm 49, and a steering engine seat 40. The bearing seat 42 is fixedly connected to the supporting arm supporting plate 28 by means of bolts. The first motor 41 passes through the supporting arm supporting plate 28 to be fixedly connected to the bearing seat 42 by means of bolts. The working mechanical arm base 43 is flangedly connected to an output shaft of the first motor 41. The reducer 47 is fixedly connected to the working mechanical arm base 43 by means of bolts. The second motor 45 is mounted on the second motor base 46, and the second motor 45 is fixedly connected to an input shaft end of the reducer 47 by means of bolts. Two ends of an output shaft of the reducer 47 pass through the mechanical arm side plates 44 to be connected to the first main mechanical arms 48 by means of pins, and then fixed on the first main mechanical arm 48 by means of mechanical arm end cap bolts. The mechanical arm side plates 44 are fixed on the working mechanical arm base 43. The steering engine seat 40 is fixedly connected to the second main mechanical arm 49. A steering engine is mounted inside the steering engine seat 40. Two ends of an output shaft of the steering engine are connected to the first main mechanical arms 48 by means of pins and then fixed by means of mechanical arm end caps. The steering engine seat 40 and the first main mechanical arm 48 form a revolving pair. The output shaft of the first motor 41 drives the working mechanical arm base 43 to rotate, the second motor 45 drives the reducer 47, the reducer 47 drives the first main mechanical arms 48 to rotate, and the output shaft of the steering engine drives the second main mechanical arm 49 to rotate.

Figure 4:
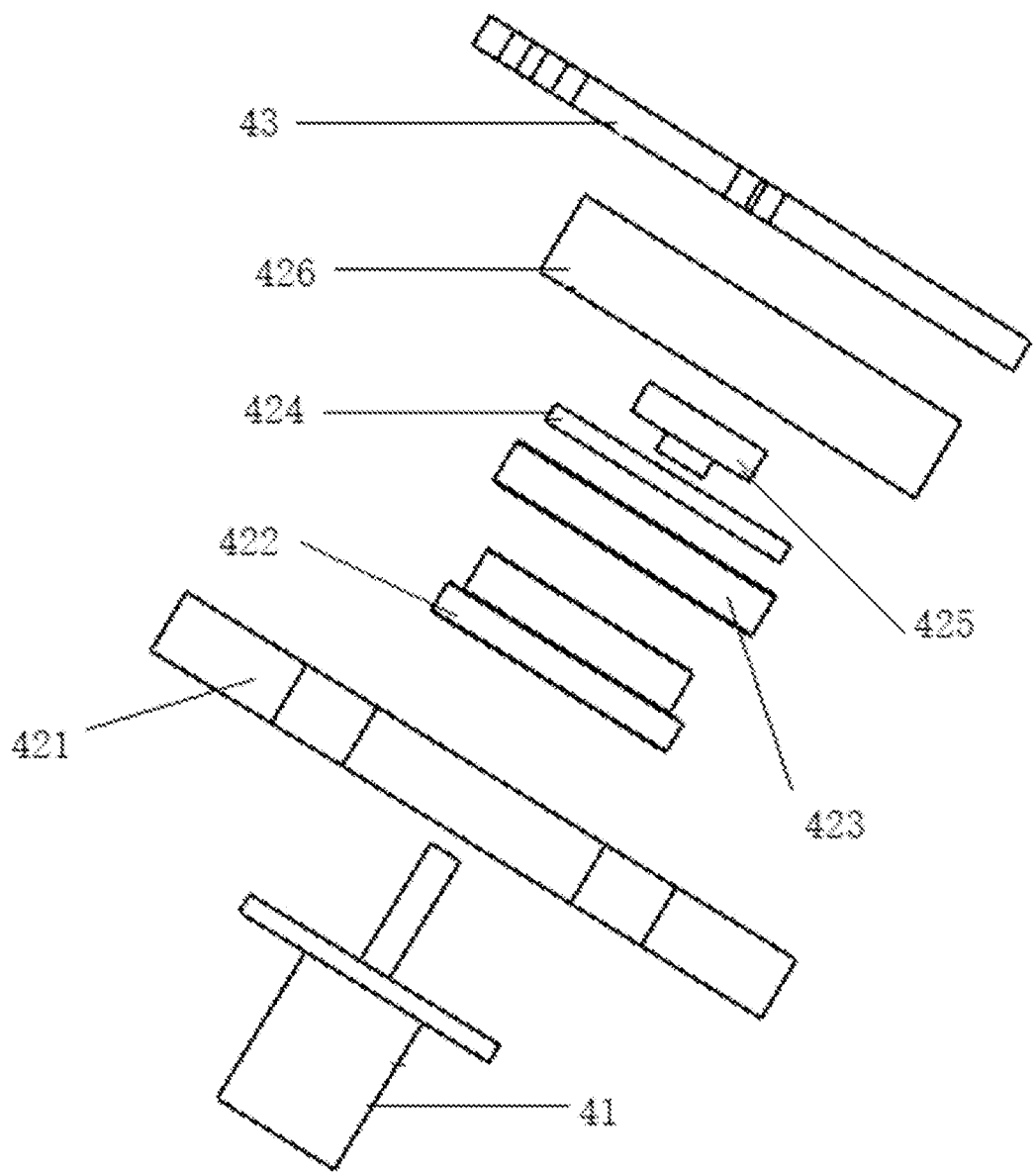
FIG. 4 is a schematic structural view of a bearing seat in the working mechanical arm of the present invention.

As shown in FIG. 4, the bearing seat 42 includes a bearing base 421, a bearing stand 422, a bearing 423, a bearing sleeve 426, a gasket 424, and a flange 425. The bearing base 421 is fixedly connected to the supporting arm supporting plate 28 by means of bolts. The bearing base 421 is provided with a recess for accommodating the first motor 41. The bearing stand 422 is coaxially fixed to the bearing base 421 by means of bolts. The bearing 423 is sleeved on the bearing stand 422. The gasket 424 is attached to the bearing 423. The output shaft of the first motor 41 sequentially passes through the bearing base 421, the bearing stand 422, the bearing 423, and the gasket 424 to be fixed to the flange 425. The flange 425 is fixedly connected to the working mechanical arm base 43 by means of bolts. The bearing sleeve 426 is sleeved on the periphery of the bearing 423, and the bearing sleeve 426 is fixedly connected to the working mechanical arm base 43 by means of bolts.

Figure 5:
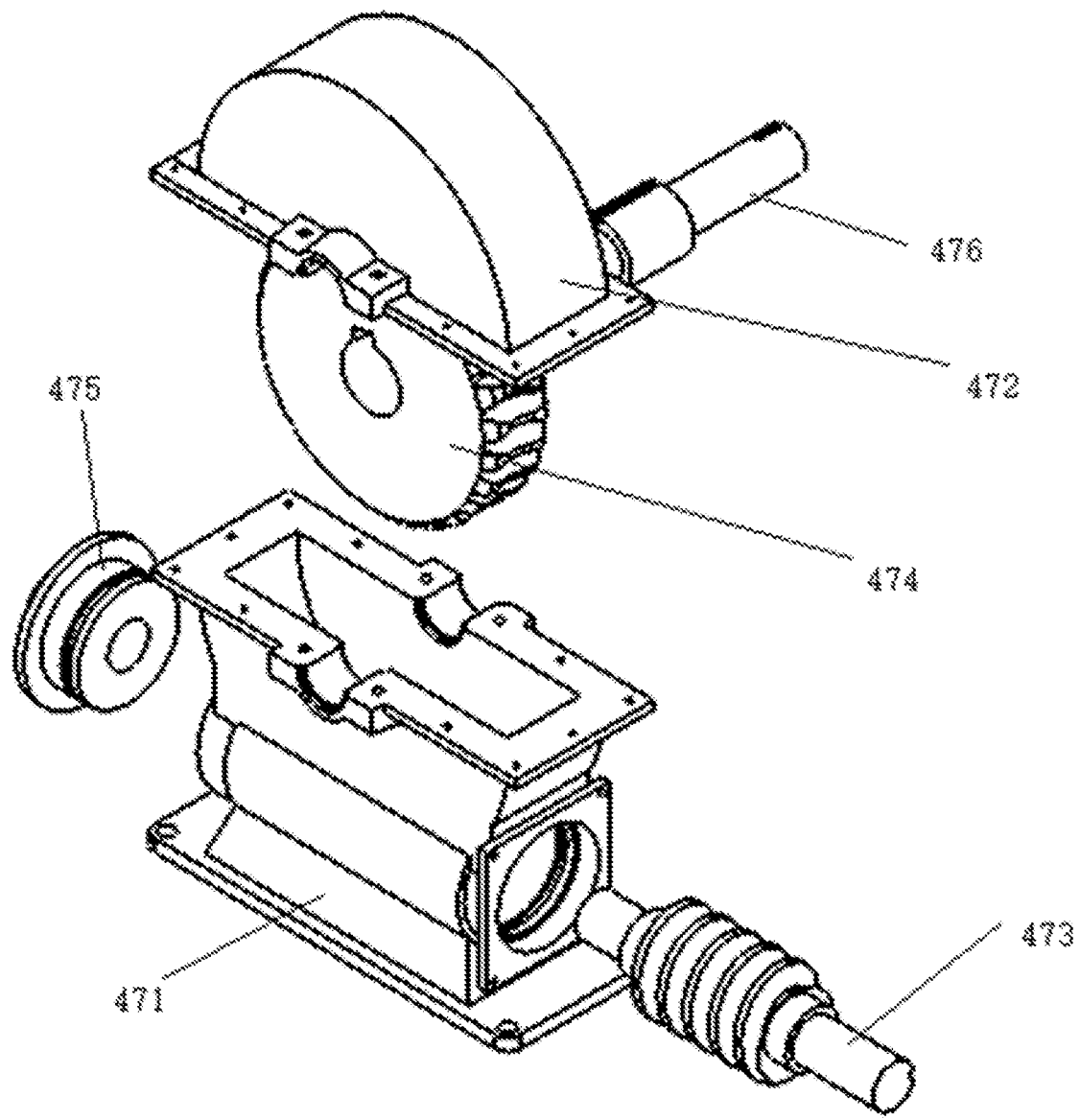
FIG. 5 is a schematic structural view of a reducer in the working mechanical arm of the present invention.

As shown in FIG. 5, the reducer 47 includes a lower shell 471, an upper shell 472, a worm 473, a worm gear 474, a lower end cap 475, and an output shaft 476. A bottom end of the lower shell 471 is fixedly connected to the working mechanical arm base 43 by means of bolts. The worm 473 is disposed inside the lower shell 471. The lower end cap 475 cooperates with the lower shell 471 to fix the worm 473. An inner cavity for accommodating the worm gear 474 is provided on an upper end of the lower shell 471. The output shaft 476 passes through the worm gear 474 and is fixed by means of pins. The upper shell 472 is covered on the upper part of the worm gear 474 and fixedly connected to a top end of the lower shell 471 by means of bolts.

Figure 6:
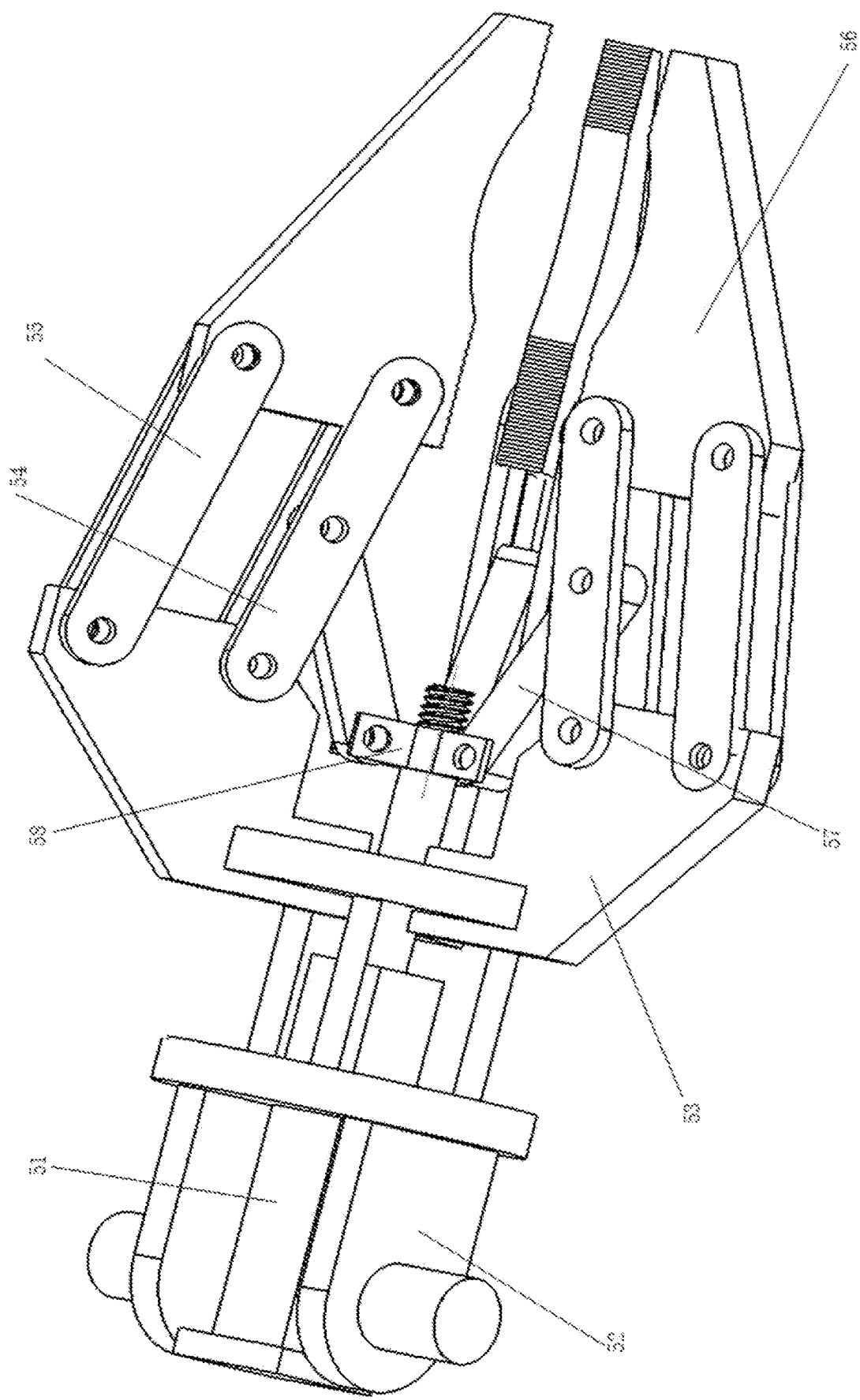
FIG. 6 is a schematic structural view of a picking manipulator in the present invention.

As shown in FIG. 6, the picking manipulator 5 consists of a first cylinder 51, a first connecting part 52, supporting joints 53, mechanical fingers 56, first joint connecting rods 54, second joint connecting rods 55, first transmission connecting rods 57, and a first transmission block 58. The first cylinder 51 is mounted on the second main mechanical arm 49 by means of bolts. The first connecting part 52 is mounted on the second main mechanical arm 49 by hole matching. Three supporting joints 53 are uniformly disposed. One end of the supporting joint 53 is fixedly connected to the first connecting part 52 by means of bolts, and the other end of the supporting joint 53 is connected to the mechanical finger 56 through the first joint connecting rod 54 and the second joint connecting rod 55. The first joint connecting rod 54 and the second joint connecting rod 55 are rotatably connected to the supporting joint 53, and the first joint connecting rod 54 and the second joint connecting rod 55 are fixedly connected to the mechanical finger 56. An output shaft of the first cylinder 51 is connected to the first transmission block 58 by means of bolts. One end of the first transmission connecting rod 57 is connected to the first transmission block 58, and the other end of the first transmission connecting rod 57 is connected to the first joint connecting rod 54. The output shaft of the first cylinder 51 drives the first transmission block 58 to move up and down, which drives the first transmission connecting rods 57 to move, and then drives the first joint connecting rods 54 to rotate, so that the mechanical fingers 56 open and close. The surface of each of the mechanical fingers 56 is made of a rubber material and is provided with a texture, and each of the mechanical fingers 56 has a curved groove structure in the middle, so that *Brasenia schreberi* can be desirably attached and wrapped with such design.

Figure 7:
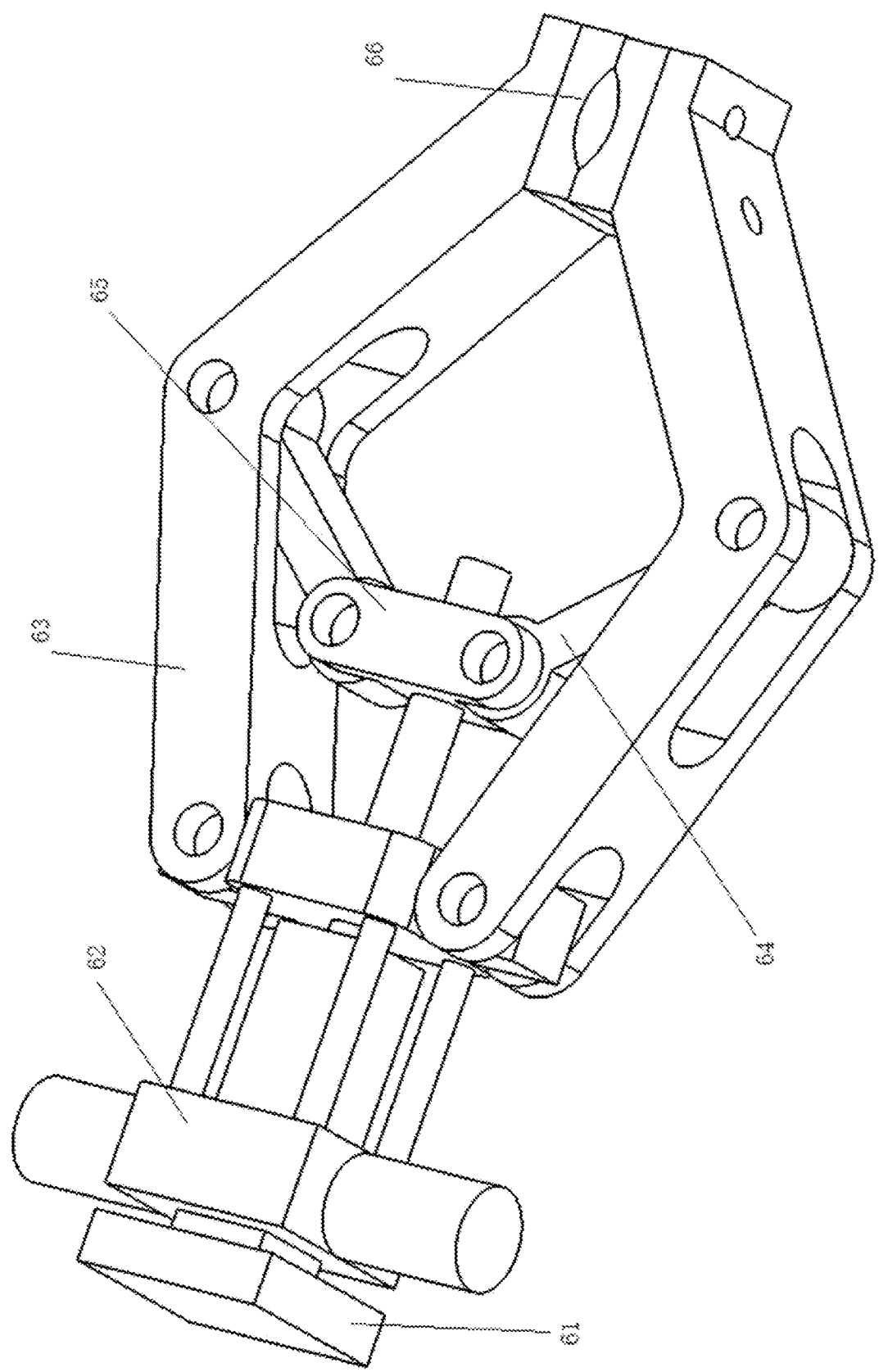
FIG. 7 is a schematic structural view of a grasping manipulator in the present invention.

As shown in FIG. 7, the grasping manipulator 6 includes a second cylinder 61, a second connecting part 62, a second transmission block 65, clamping arms 63, second transmission connecting rods 64, and sponges 66. The second cylinder 61 is mounted on the second main mechanical arm 49 by means of bolts. The second connecting part 62 is connected to the second main mechanical arm 49 by hole matching. The clamping arm 63 is connected to the second connecting part 62 by means of a hinge to form a revolving pair. The sponge 66 is fixed on a tail end of the clamping arm 63. An output shaft of the second cylinder 61 is fixedly connected to the second transmission block 65 by means of bolts. Two ends of the second transmission connecting rod 64 are rotatably connected to the second transmission block 65 and the clamping arm 63 respectively. The second cylinder 61 drives the second transmission block 65 to extend up and down, and drives the clamping arms 63 to close and open through the second transmission connecting rods 64. The sponge 66 is mounted on the tail end of the clamping arm 63 to ensure that the stems of the *Brasenia schreberi* are not damaged during operation of the grasping manipulator.

Figure 8:
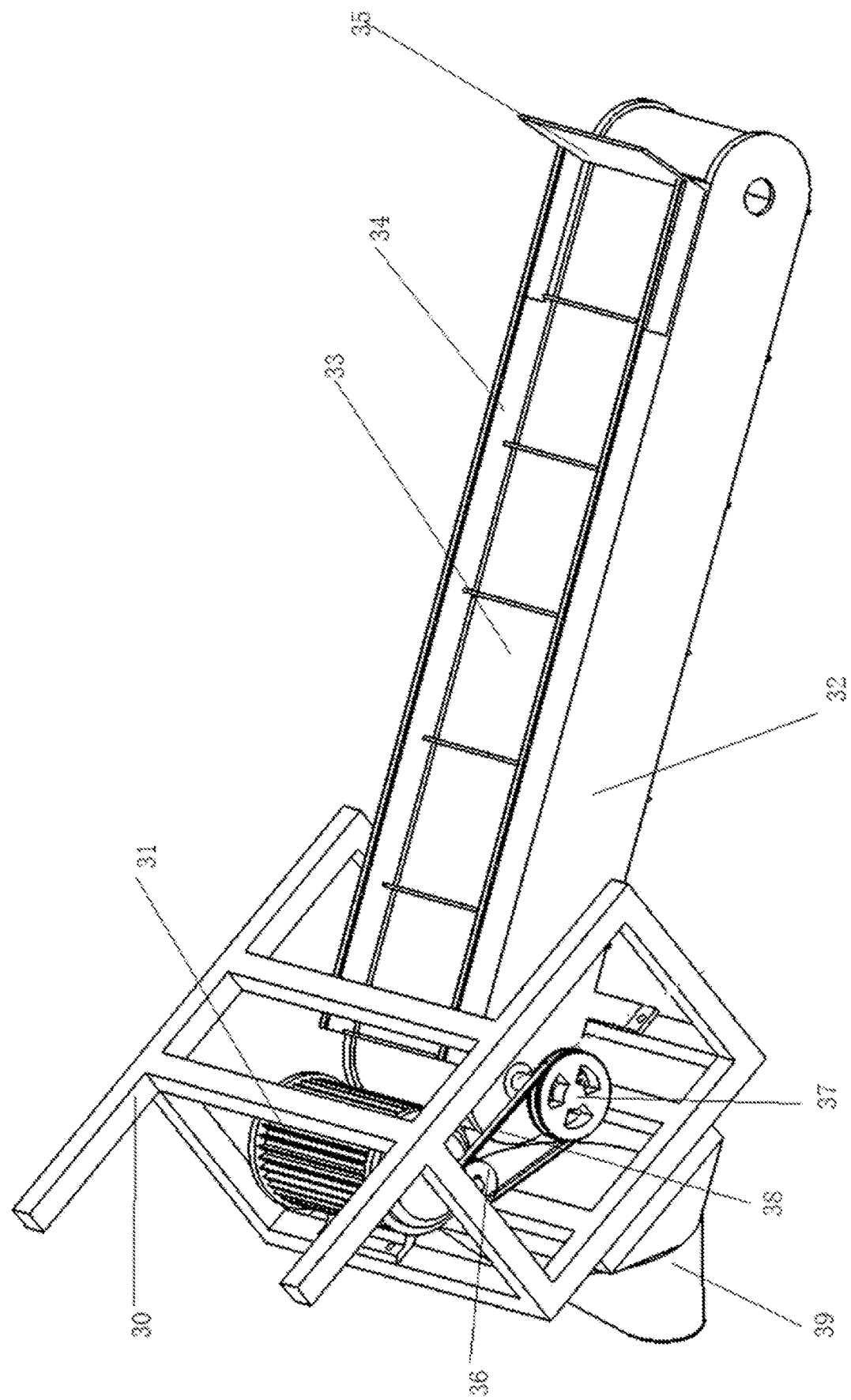
FIG. 8 is a schematic structural view of a collection device in the present invention.

As shown in FIG. 8, the collection device 3 includes a conveyor belt rack 32, a conveyor belt 33, first stopper plates 34, a second stopper plate 35, a fixing frame 30, a net bag 39, a third motor 31, a belt 38, a small belt pulley 36, and a big belt pulley 37. The fixing frame 30 is mounted on the boat 1 and fixedly connected to the boat 1. The third motor 31 is fixedly connected to the fixing frame 30 by means of bolts. The conveyor belt rack 32 is fixedly connected to the fixing frame 30. An output shaft of the third motor 31 is connected to the small belt pulley 36 by means of a pin. The big belt pulley 37 is connected to the conveyor belt by means of a shaft pin. The big belt pulley 37 is fixed to a drum shaft of the conveyor belt rack 32. The big belt pulley 37, the small belt pulley 36, and the belt 38 form a transmission mechanism. The first stopper plates 34 are fixed on two sides of the conveyor belt rack 32, and the second stopper plate 35 is mounted on a tail end of the conveyor belt rack 32. The conveyor belt rack 32 is provided with the conveyor belt 33. The net bag 39 is mounted below the fixing frame 30. The output shaft of the third motor 31 serves as a driving member and drives the big belt pulley 37 to rotate through the belt 38, and then drives a drum shaft of the fixing frame 30, so that the conveyor belt 33 turns. The collected *Brasenia schreberi* falls into the net bag 39. The conveyor belt 33 is provided with equally-spaced baffle plates, and the baffle plate is provided with drainage holes to reduce falling of the collected *Brasenia schreberi*.

The visual system includes an overwater camera 83, an underwater camera 82, and a boom 84. The boom 84 is fixedly connected to the boat 1 by means of bolts. The overwater camera 83 is mounted on a tail end of the boom 84. The overwater camera 83 is located above the picking manipulator 5 and the grasping manipulator. The underwater camera 82 is mounted on the supporting arm supporting plate 28 and located between the two working mechanical arms 4.

The stepper motors 23, the push rod 9, the first motor 41, the second motor 45, the steering engine, the first cylinder 51, the second cylinder 61, the third motor 31, the overwater camera 83, and the underwater camera 82 are all in signal connection with the control box 7.

An operating method of a *Brasenia schreberi* collection system based on machine vision, where the specific operating method is as follows:

step (1), before operation, the control box 7 adjusts an operating angle of the supporting arm supporting plate 28 through the stepper motors 23 and the push rod 9, and operation starts after the operating angle of the working mechanical arms 4 is adjusted; during operation, first, general location information of *Brasenia schreberi* is collected through the overwater camera 83, accurate location information of the *Brasenia schreberi* is found through the underwater camera 82, and the information collected by the cameras is sent to the control box 7;

step (2), the control box 7 controls the first motor 41 to drive the working mechanical arm base 43 to rotate, the control box 7 controls the second motor 45 to drive the reducer 47 and drive the first main mechanical arms 48 to rotate, and the control box 7 further controls the steering engine to drive the second main mechanical arm 49 to rotate, so that the grasping manipulator 6 aims at *Brasenia schreberi* to be grasped;

step (3), the control box 7 controls the second cylinder 61 to extend, and the clamping arms 63 open; the second cylinder 61 retracts, and the clamping arms 63 grip stems of the *Brasenia schreberi*;

step (4), the control box 7 controls the first motor 41 to drive the working mechanical arm base 43 to rotate, the control box 7 controls the second motor 45 to drive the reducer 47 and drive the first main mechanical arms 48 to rotate, and the control box 7 further controls the steering engine to drive the second main mechanical arm 49 to rotate, so that the picking manipulator 5 aims at the *Brasenia schreberi* to be picked;

step (5), the control box 7 controls the first cylinder 51 to drive the first transmission block 58 to move up and down, drive the first transmission connecting rods 57 to move, and then drive the first joint connecting rods 54 to rotate, so that the mechanical fingers 56 open and close to pick the *Brasenia schreberi* on the stems;

step (6), the picking manipulator 5 picks and stores the *Brasenia schreberi* in the mechanical fingers 56, the control box 7 controls the first motor 4 to drive the working mechanical arm base 43 to rotate, the control box 7 controls the second motor 45 to drive the reducer 47 and drive the first main mechanical arms 48 to rotate, and the control box 7 further controls the steering engine to drive the second main mechanical arm 49 to rotate to a position above the conveyor belt 33 and release the picked *Brasenia schreberi*;

step (7), the control box 7 controls the third motor 31 to drive the belt 38 and drive the big belt pulley 37 to rotate, and then drive the conveyor belt 33, so that the conveyor belt 33 transports the *Brasenia schreberi* to the net bag 39 to complete a picking process.

The described embodiments are preferred embodiments of the present invention, but the present invention is not limited to the aforementioned embodiments. Any obvious improvements, substitutions or modifications that can be made by those skilled in the art without departing from the essential content of the present invention shall fall within the protection scope of the present invention.

What is claimed is:

1. A device for picking and collecting *Brasenia schreberi* based on a machine vision, characterized by comprising a supporting mechanical arm, a collection device, two working mechanical arms, a picking manipulator, a grasping manipulator, a control box, and a visual system, wherein the supporting mechanical arm is fixed on a front end of a boat; the two working mechanical arms are fixed on a front end of the supporting mechanical arm; the picking manipulator and the grasping manipulator are mounted on tail ends of a first working mechanical arm and a second working mechanical arm of the two working mechanical arms, respectively; and the collection device is fixed on the boat;

the supporting mechanical arm comprises a supporting arm bottom plate, supporting arm side plates, a supporting arm rotary arm, a connecting plate, and a supporting arm supporting plate; the supporting arm bottom plate is fixed on the front end of the boat, the supporting arm side plates are respectively mounted on two sides of the supporting arm bottom plate, stepper motors are respectively mounted on the supporting arm side plates, and the stepper motors are connected to a first connecting shaft; a first end of the supporting arm rotary arm is fixed to the first connecting shaft, and a second end of the supporting arm rotary arm is connected to the connecting plate through a second connecting shaft to form a revolving pair; the connecting plate is fixed to the supporting arm supporting plate; the supporting arm supporting plate is fixed on a first end of a push rod, and a second end of the push rod is fixed on the boat;

the collection device comprises a fixing frame, a third motor, a conveyor belt, a transmission mechanism, and a net bag; the fixing frame is mounted on the boat; the conveyor belt is fixed on the fixing frame through a conveyor belt rack; the third motor drives the conveyor belt to turn through the transmission mechanism; the net bag is mounted below the fixing frame;

the picking manipulator comprises a first cylinder, a first connecting part, a plurality of supporting joints, and mechanical fingers; the first cylinder and the first connecting part are mounted on the tail end of the first working mechanical arm; the plurality of supporting joints are uniformly disposed; a first end of each of the plurality of supporting joints is fixedly connected to the first connecting part, and a second end of the each of the plurality of supporting joints is connected to a mechanical finger of the mechanical fingers through a first joint connecting rod and a second joint connecting rod; the first joint connecting rod and the second joint connecting rod are rotatably connected to the each of the plurality of supporting joints, and the first joint connecting rod and the second joint connecting rod are fixedly connected to the mechanical finger; the first cylinder is connected to a first transmission block; a first end of a first transmission connecting rod is connected to the first transmission block, and a second end of the first transmission connecting rod is connected to the first joint connecting rod;

the grasping manipulator comprises a second cylinder, a second connecting part, and clamping arms; the second cylinder and the second connecting part are mounted on the tail end of the second working mechanical arm; each of the clamping arms is connected to the second connecting part to form a revolving pair; the second cylinder is fixedly connected to a second transmission block; two ends of a second transmission connecting rod are rotatably connected to the second transmission block and the each of the clamping arms, respectively;

the stepper motors, the push rod, the first cylinder, the second cylinder, the third motor, and the visual system are in a signal connection with the control box; and each of the two working mechanical arms comprises a bearing seat, a first motor, a reducer, a second motor, first main mechanical arms, a second main mechanical arm, and a steering engine seat.

2. The device for picking and collecting the *Brasenia schreberi* based on the machine vision according to claim 1, wherein the bearing seat is fixedly connected to the supporting arm supporting plate, and the bearing seat is fixedly connected to the first motor; the first motor is connected to a working mechanical arm base, and the working mechanical arm base is fixedly connected to the reducer; an input end of the reducer is connected to the second motor, and an output shaft of the reducer is connected to the first main mechanical arms, the steering engine seat is fixedly connected to the second main mechanical arm, and a steering engine inside the steering engine seat is connected to the first main mechanical arms; and the first motor, the second motor, and the steering engine are in a signal connection with the control box.

3. The device for picking and collecting the *Brasenia schreberi* based on the machine vision according to claim 2, wherein the bearing seat comprises a bearing base, a bearing stand, a bearing, a bearing sleeve, a gasket, and a flange; the bearing base is connected to the supporting arm supporting plate, the bearing base is coaxially fixed to the bearing stand, the bearing is sleeved on the bearing stand, and the bearing is attached to the gasket; an output shaft of the first motor sequentially passes through the bearing base, the bearing stand, the bearing, and the gasket to be fixed to the flange; the bearing sleeve is sleeved on a periphery of the bearing; and the flange and the bearing sleeve are fixedly connected to the working mechanical arm base.

4. The device for picking and collecting the *Brasenia schreberi* based on the machine vision according to claim 1, wherein a surface of each of the mechanical fingers is made of a rubber material and is provided with a texture, and the each of the mechanical fingers is provided with a curved groove in a middle.

5. The device for picking and collecting the *Brasenia schreberi* based on the machine vision according to claim 1, wherein a sponge is fixed on a tail end of the each of the clamping arms.

6. The device for picking and collecting the *Brasenia schreberi* based on the machine vision according to claim 1, wherein first stopper plates are fixed on two sides of the conveyor belt rack, and a second stopper plate is mounted on a tail end of the conveyor belt rack.

7. The device for picking and collecting the *Brasenia schreberi* based on the machine vision according to claim 1, wherein the conveyor belt is provided with equally-spaced baffle plates, and the equally-spaced baffle plates are each provided with drainage holes.

8. The device for picking and collecting the *Brasenia schreberi* based on the machine vision according to claim 1, wherein the visual system comprises an overwater camera and an underwater camera; the overwater camera is located above the picking manipulator and the grasping manipulator; and the underwater camera is mounted on the supporting arm supporting plate and located between the two working mechanical arms.

9. A method for picking and collecting the *Brasenia schreberi* based on a machine vision using the device according to claim 1, wherein the control box adjusts an operating angle of the supporting arm supporting plate through the stepper motors and the push rod; the visual system determines a location of the *Brasenia schreberi* and sends the location to the control box; the control box controls the second working mechanical arm to drive the grasping manipulator to grip stems of the *Brasenia schreberi*; the control box controls the first working mechanical arm to drive the picking manipulator to pick the *Brasenia schreberi*; the control box controls the picking manipulator to rotate to a position above the conveyor belt; and the conveyor belt transports the *Brasenia schreberi* to the net bag to complete a picking process.

* * * * *